(12) United States Patent
Behr

(10) Patent No.: US 12,528,045 B2
(45) Date of Patent: Jan. 20, 2026

(54) PROCESS FOR SEPARATING CARBON DIOXIDE FROM AN AIR FLOW

(71) Applicant: Greenlyte Carbon Technologies GmbH, Essen (DE)

(72) Inventor: Peter Behr, Essen (DE)

(73) Assignee: Greenlyte Carbon Technologies GmbH, Essen (DE)

( * ) Notice: Subject to any disclaimer, the term of this patent is extended or adjusted under 35 U.S.C. 154(b) by 0 days.

(21) Appl. No.: 18/841,974

(22) PCT Filed: Mar. 3, 2023

(86) PCT No.: PCT/EP2023/055467
§ 371 (c)(1),
(2) Date: Aug. 27, 2024

(87) PCT Pub. No.: WO2023/166188
PCT Pub. Date: Sep. 7, 2023

(65) Prior Publication Data
US 2025/0161866 A1 May 22, 2025

(30) Foreign Application Priority Data
Mar. 3, 2022 (DE) .......................... 102022105042.4

(51) Int. Cl.
*B01D 53/02* (2006.01)
*B01D 53/14* (2006.01)

(52) U.S. Cl.
CPC ..... *B01D 53/1475* (2013.01); *B01D 53/1425* (2013.01); *B01D 2252/10* (2013.01);
(Continued)

(58) Field of Classification Search
CPC .......... B01D 2252/10; B01D 2252/204; B01D 2252/602; B01D 2257/504; B01D 2258/06; B01D 53/1425; B01D 53/1475
See application file for complete search history.

(56) References Cited

U.S. PATENT DOCUMENTS 3,511,712 A * 5/1970 Giner ................. B01D 53/1425
429/409
4,197,421 A 4/1980 Steinberg
(Continued)

FOREIGN PATENT DOCUMENTS

EP        2163294 A1    3/2010
EP        2737937 A1    6/2014
(Continued)

OTHER PUBLICATIONS

Iizuka, A. et al., "Carbon dioxide recovery from carbonate solutions using bipolar membrane electrodialysis", Separation and Purification Technology, Sep. 23, 2012, pp. 49-59.

*Primary Examiner* — Christopher P Jones
(74) *Attorney, Agent, or Firm* — Slater Matsil, LLP

(57) ABSTRACT

In an embodiment a method includes a) providing an aqueous solution of a carbon dioxide absorption agent, wherein the carbon dioxide absorption agent comprises cations of the 1st main group of the periodic table, b) passing an air flow containing carbon dioxide through the aqueous solution of method step a), wherein at least a part of the carbon dioxide from the air flow is bound to the carbon dioxide absorption agent and the air flow is depleted in carbon dioxide and c) introducing the aqueous solution of method step b) or an aqueous solution including the carbon dioxide bound to the carbon dioxide absorption agent into a middle chamber of an at least three-chamber electrolysis cell, wherein the three-chamber electrolysis cell includes a membrane selective for monovalent cations, and electrolyzing the aqueous solution of method step b) or the aqueous solution comprising the carbon dioxide bound to the carbon dioxide absorption agent under release of at least a part of the carbon dioxide.

14 Claims, 9 Drawing Sheets

(52) U.S. Cl.
CPC .. *B01D 2252/204* (2013.01); *B01D 2252/602* (2013.01); *B01D 2257/504* (2013.01); *B01D 2258/06* (2013.01)

(56) References Cited

U.S. PATENT DOCUMENTS

| | | | |
|---|---|---|---|
| 4,470,894 | A | 9/1984 | Dyer |
| 8,535,502 | B2 | 9/2013 | Littau et al. |
| 10,173,178 | B1 * | 1/2019 | Deshpande .......... B01D 71/381 |
| 11,219,860 | B1 | 1/2022 | Jakobsen |
| 2007/0045125 | A1 | 3/2007 | Hartvigsen et al. |
| 2010/0092359 | A1 | 4/2010 | Svendsen et al. |
| 2011/0277474 | A1 | 11/2011 | Constantz et al. |
| 2014/0151240 | A1 | 6/2014 | Bedell et al. |
| 2016/0362800 | A1 * | 12/2016 | Ren ....................... C25B 11/073 |
| 2017/0209826 | A1 | 7/2017 | Juutilainen |
| 2019/0085472 | A1 | 3/2019 | Willauer et al. |
| 2021/0308623 | A1 * | 10/2021 | Sorimachi ............ B01D 53/326 |
| 2021/0340681 | A1 * | 11/2021 | Rau ........................... C25B 1/20 |
| 2022/0002889 | A1 * | 1/2022 | Rau ........................... C25B 1/16 |
| 2022/0097004 | A1 | 3/2022 | Makaruk et al. |
| 2022/0118406 | A1 | 4/2022 | Lackner |
| 2022/0170171 | A1 * | 6/2022 | Tahmasebi ................ C25B 1/22 |
| 2023/0264141 | A1 | 8/2023 | Dietz |
| 2024/0149240 | A1 * | 5/2024 | Lammers .............. C25B 15/081 |
| 2024/0198280 | A1 * | 6/2024 | Behr ................... B01D 53/1475 |

FOREIGN PATENT DOCUMENTS

| | | |
|---|---|---|
| EP | 3384973 A1 | 10/2018 |
| WO | 2008072979 A1 | 6/2008 |
| WO | 2020152330 A1 | 7/2020 |
| WO | 2020163513 A1 | 8/2020 |
| WO | 2022023387 A1 | 2/2022 |

* cited by examiner

PROCESS FOR SEPARATING CARBON DIOXIDE FROM AN AIR FLOW

CROSS-REFERENCE TO RELATED APPLICATIONS

This patent application is a national phase filing under section 371 of PCT/EP2023/055467, filed Mar. 3, 2023, which claims the priority of German patent application 102022105042.4, filed Mar. 3, 2022, each of which is incorporated herein by reference in its entirety.

TECHNICAL FIELD

The present invention relates to a method for isolating carbon dioxide from an air flow

BACKGROUND

One of the greatest challenges of the 21st century will be to return the gas composition of the atmosphere to levels that prevent excessive global warming. It has been scientifically proven that the warming in recent decades in particular is due to an increase in so-called greenhouse gases. Carbon dioxide in particular is a key greenhouse gas, with the sharp rise in carbon dioxide concentrations being due to the increased burning of fossil fuels. In this respect, it will be important in the near future not only to reduce new carbon dioxide emissions but also to provide technical solutions for the absorption and storage of carbon dioxide from the environment. Only by largely avoiding new greenhouse gases and dealing efficiently with existing ones can unwanted global warming be kept within reasonably tolerable limits.

One technical possibility for removing carbon dioxide from the air is to pass the carbon dioxide over or through an adsorbent and to selectively remove it from the air flow by this. This reduces the concentration of carbon dioxide in the air, while the concentration of carbon dioxide in the adsorbent increases during the method. This procedure is known for a large number of different absorbents, wherein the systems are sufficiently complex, as both the concentration of carbon dioxide and the ambient conditions during absorption can be so variable that different absorption efficiencies are achieved with different absorbents. Furthermore, environmental aspects naturally play a major role, as efficient compositions are not always particularly environmentally friendly. Another aspect is that the uptake medium must be cost-effective and must not hinder the further processing of the up-taken carbon dioxide. The latter is particularly important, as energy- and cost-saving isolation of the carbon dioxide once it has been taken up, ideally with unrestricted reusability of the absorption agent, contributes greatly to the energy balance and thus the attractiveness of the entire method. Thus, the economic efficiency and environmental friendliness of the method depends not only on the uptake, but also on the further method steps, which should ultimately contribute to providing carbon dioxide streams that are as pure as possible. These streams can then be converted into desirable valuable substances, such as hydrocarbons or alcohols, in various further steps, which can make an additional contribution to the environmental balance.

Based on these considerations, a large number of carbon dioxide absorbents suitable for taking up carbon dioxide and principal possibilities for processing them have found their way into the patent literature.

For example, WO 2008 072 979 A1 discloses a method for capturing $CO_2$ from exhaust gas in an absorber, wherein the $CO_2$-containing gas is passed through an aqueous absorbing sludge, characterized in that the aqueous absorbing sludge includes an inorganic alkaline carbonate, bicarbonate and at least one of absorption accelerator and catalyst, and the $CO_2$ is converted into solids by precipitation in the absorber, wherein the sludge with the precipitated solids is conveyed to a separation device in which the solids are separated and substantially all of the at least one of absorption accelerator and catalyst is returned to the absorber together with the remaining aqueous phase.

In another patent document, WO 2020 152 330 A1, a method for separating and recovering carbon dioxide from ambient air becomes apparent. The method comprises continuously carrying out the following steps: a) bringing ambient air into contact with an aqueous solution of at least one alkali metal or alkaline earth metal cation for absorbing the carbon dioxide in the solution to form the hydrogen carbonate or carbonate of the at least one metal, respectively; b) electrodialysis of the resulting solution using a combination of bipolar ion exchange membranes and ion exchange membranes selective for monovalent or polyvalent anions to obtain a solution enriched in (hydrogen) carbonate ions and a solution depleted thereof, wherein the solution depleted in (hydrogen) carbonate ions is recycled to step a); c) thermally desorbing the carbon dioxide from the (hydrogen) carbonate ion enriched solution obtained in step b) by means of steam stripping to obtain a carbon dioxide/water vapor mixture and a $CO_2$ depleted solution which is recycled to step b), wherein a pH between 7 and 8.5 or between 8 and 9.5 is adjusted therein; and d) separating water from the resulting carbon dioxide/water vapor mixture by means of cooling to condense the water vapor and, if necessary, further drying the carbon dioxide.

In EP 3 384 973 A1 a method for recovering carbon dioxide to enrich the gas streams used to produce sodium carbonate and sodium hydrogen carbonate by the ammonia-soda method is described. The method comprises: contacting the streams of method gases and/or outlet gases occurring in the method for the production of sodium carbonate and sodium hydrogen carbonate by the ammonia-soda method in the $CO_2$ absorption column comprising:

a part or all of a gas stream originating from lime combustion in shaft lime kilns with air blast, and/or—a part or all of an outlet gas stream from the plant for carbonation of soda and/or a part or all of the outlet gas stream from the baking powder carbonization plant, and, where appropriate, one or more streams of flue gases or other carbon dioxide-containing gases resulting from the combustion of solid, liquid or gaseous fuels to produce heat or electrical energy to meet production requirements by the ammonia-soda method;

and optionally one or more flue gas streams or other carbon dioxide-containing gases originating from an external supplier with a stream of an aqueous absorbing solution to form a carbon dioxide-enriched aqueous absorbing solution, heating a carbon dioxide-enriched aqueous absorption solution in a evaporator, desorbing gaseous carbon dioxide under regeneration of an aqueous absorbing solution in a desorption column, cooling the regenerated aqueous absorption solution and returning to the $CO_2$ absorption column and removing from the desorption column and cooling the stream with a high carbon dioxide content for use in the method of producing sodium carbonate and sodium hydrogen carbonate by the ammonia-soda method.

Such solutions known from the state of the art can offer further potential for improvement, particularly with regard to the efficiency of carbon dioxide absorption under variable ambient conditions and in particular with regard to the possibility of simply and quickly desorbing carbon dioxide from the uptake liquid once it has been bound with a low energy input.

SUMMARY

Embodiments provide a method which is capable of desorbing carbon dioxide once bound in an absorption liquid as energy-efficiently and as quickly as possible in an isolated form which is as pure as possible.

According to embodiments, there is accordingly a method for isolating carbon dioxide from an air flow, wherein the method comprises at least the steps of:
a) providing an aqueous solution of a carbon dioxide absorption agent, wherein the carbon dioxide absorption agent comprises cations from the 1st main group of the periodic table;
b) passing an air flow containing carbon dioxide through the solution provided in method step a), wherein at least a part of the carbon dioxide from the air flow is bound to the carbon dioxide absorption agent and the air flow is depleted in carbon dioxide;
c) introducing the aqueous solution of method step b) or an aqueous solution comprising the carbon dioxide bound to the carbon dioxide absorption agent into a middle chamber of an at least three-chamber electrolysis cell of anode chamber, cathode chamber and at least one middle chamber arranged between the anode chamber and the cathode chamber, wherein the three-chamber electrolysis cell comprises a membrane selective for monovalent cations, and electrolyzing the aqueous solution under release of at least a part of the carbon dioxide.

Surprisingly, it was found that carbon dioxide can be very efficiently taken up from air flows using the above method and very selectively freed from the absorption agent via electrolysis. This overall method can be used to effectively treat very different air flows with widely varying carbon dioxide contents. For example, carbon dioxide can be absorbed from normal ambient air with a relatively low carbon dioxide content or from exhaust gas streams with a very high carbon dioxide content. The liquids loaded with carbon dioxide can be processed in a particularly energy-efficient way using electrolysis, so that the carbon dioxide can be desorbed from the liquid without using a lot of energy. Another advantage of this method is that the carbon dioxide can be produced in pure form. For example, it is possible to control the release of carbon dioxide from the liquid during electrolysis so that this gas is essentially pure. In these cases, the carbon dioxide gas stream does not have to be further freed from other gas components. In these cases, the method can be used to coordinate the two individual steps of carbon dioxide uptake and release in such a way that the liquid is circulated to take up the carbon dioxide. This can result in a flexibly adaptable overall method that can be operated continuously. In addition, the method according to embodiments is significantly more advantageous than the electrolytic processing of aqueous KOH solutions containing carbon dioxide known from the prior art. In the latter, efficiencies of only 70% to 80% are achieved. The efficiency losses result mainly from the overvoltage at the anode. If the aqueous electrolyte consisting of a KOH leach is replaced by an aqueous $KHCO_3^-$ mixture, which is produced during $CO_2$ absorption from the air, and if the anodes and cathode chamber are separated by a cation-selective membrane, $CO_2$ is released at the anode in addition to $O_2$. If the separated $CO_2$ is to be used as a synthesis building block in a downstream process, this method is only suitable to a limited extent, as the oxygen has to be removed from the carbon dioxide-oxygen gas mixture in a very complex and energy-intensive process. This problem can be avoided by carrying out the electrolysis in a 3-chamber setup. In this method step, the different gases, oxygen, carbon dioxide and hydrogen, can be collected in separate chambers, meaning that it is not necessary to separate the components.

The method according to embodiments is a method for isolating carbon dioxide from an air flow. The method is thus capable of selectively removing carbon dioxide from an air flow and then, in a further method step, making it available again essentially in pure form. The carbon dioxide is therefore separated from other gas components by the absorption and the desorption. Various gaseous mixtures are suitable as air flows for this purpose. For example, the air flow can be ambient air. However, it is also possible for the air flow to be the exhaust gas flow from a combustion process. In this respect, the different air flows can differ in composition due to the other gas components. In addition, the method according to embodiments is suitable for treating air flows with significantly different carbon dioxide contents. For example, the air flow can contain carbon dioxide in a concentration of greater than or equal to 100 ppm, further preferably greater than or equal to 500 ppm and more preferably greater than or equal to 1000 ppm.

In method step a), an aqueous solution of a carbon dioxide absorption agent is provided, wherein the carbon dioxide absorption agent comprises cations of the 1st main group of the periodic table. The prerequisite for the absorption of carbon dioxide from the air flow is the presence of a corresponding absorption agent in an aqueous solution. The method according to embodiments can be carried out with a variety of different absorption agents. However, an essential prerequisite is that the absorption agent comprises cations of the 1st main group. In this respect, the absorption agent can comprise potassium or sodium ions, for example, as components. The absorption agent does not necessarily have to be present as a salt. It is also possible for an in solution uncharged absorption agent to be present, wherein further components in the form of a salt-like compound with the corresponding cations of the 1st main group are added in addition to the actual absorption agent. The proportion of absorption agent can be adjusted according to the separation task at hand and the carbon dioxide concentrations in the air flow. Thus, the proportion of absorption agent can preferably be greater than or equal to 2.5 wt. %, further preferably greater than or equal to 7.5 wt. %, and further preferably greater than or equal to 15 wt. % based on the aqueous solution. The cations of the first main group therefore come from the group of alkali ions, for example lithium, sodium, potassium, or rubidium. According to the proportion of absorption agent, the aqueous solution can preferably comprise greater than or equal to 75 wt. %, further preferably greater than or equal to 80 wt. %, and further preferably greater than or equal to 85 wt. % of water.

In principle, all $CO_2$-absorbents are suitable here, provided they show sufficient solubility in the aqueous solution. In contact of the dissolved substance with the ambient air, for example, inorganic carbonates, amines, polyethylene glycol amines, diaminopolyethylene glycols, carboxylic acid derivatives of polyethylene glycol amines, polyethyleneimines, amine-containing sugar derivatives, amino acids, or mixtures of at least two of these components show suitable properties. This group selection advantageously exhibits an almost negligible vapor pressure and no potential health or environmental hazards. As amines primary, secondary, or tertiary amines from a molecular weight range of less than or equal to 1000 g/mol are suitable. Polyethylene glycol amines, diaminopolyethylene glycols, and carboxylic acid derivatives of polyethylene glycol amines can be substances in which one (polyethylene glycol amine) or both OH groups (diaminopolyethylene glycol) of the PEG have been replaced by amine groups. The carboxylic acid derivatives are structured accordingly, wherein one or both OH groups have been replaced by carboxylic acid groups (—COOH). As sugar derivatives are, for example, N-methyl-D-glucamine (meglumine) and N-ethyl-D-glucamine (eglumine) suitable. Both have very good solubility and negligible vapor pressure in solution.

Polyethyleneimines according to the following formula are also suitable as absorption agent:

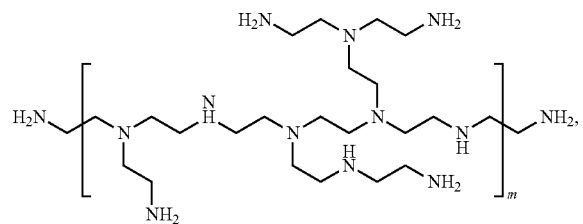

wherein the properties with regard to viscosity, vapor pressure and carbon dioxide absorption can be fine-tuned via the number m. Preferably, the molecular weight of the branched polyethyleneimines can be less than or equal to 800 g/mol.

In addition to the absorption agent, the aqueous solution can comprise further components in the form of polyols, which can be used in particular to regulate the viscosity and the water vapor pressure of the liquid. As further components, the carbon dioxide absorbent can comprise, for example, polyethylene glycols or polyols with a molecular weight of less than or equal to 1000 g/mol in a proportion of greater than or equal to 2 wt. % and less than or equal to 93 wt. %. In contact with the ambient air, polyethylene glycol (PEG) or polyols which comprise a specially defined vapor pressure and do not have any effect which is hazardous to the environment or health are suitable for this purpose. Polyethylene glycols with the general molecular formula $C_{2n}H_{4n+2}O_{n+1}$ have proven to be particularly suitable:

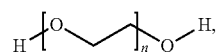

wherein n can be selected from 1 to 10, for example. The partial pressure of the substances at 298 K drops from 5 Pa for n=1 to $5.47*10^{-8}$ Pa for n=8. PEGs from n>4 are considered non-volatile. The polyethylene glycols also comprise exceptionally low toxicity values and are completely biodegradable up to n<20. To adjust the water vapor partial pressure, the organic compounds can be mixed with water in any ratio. Polyols in the sense of embodiments are aliphatic substances which carry at least two —OH groups. Preferably the polyols carry at least 3, more preferably 4 OH groups. A preferred representative from this group is, for example, glycerol. Further preferably, the second component b) can be present in the carbon dioxide absorbent in a weight proportion of greater than or equal to 30 wt. % and less than or equal to 90 wt. %, further preferably greater than or equal to 35 wt. % and less than or equal to 85 wt. %.

In method step b), an air flow containing carbon dioxide is passed through the solution provided in method step a), wherein at least a part of the carbon dioxide from the air flow is bound to the carbon dioxide absorption agent and the air flow is depleted of carbon dioxide. The air flow is brought into contact with the solution provided. The air flow can be brought into contact with the liquid in different ways. For example, it is possible that the air flow is jetted passed through the liquid in form of his distributed beads. However, it is also possible for the liquid to be provided in the form of a flowing film, which then contacts the air flow. In all cases, it makes sense to provide an exchange surface as large as possible between the air flow and the liquid. As a function of the specific design of the liquid, the temperature, the pressure, and the contact time, a part of the carbon dioxide will pass from the air flow into the liquid and be bound in it. The specific interactions between carbon dioxide and absorption agent can be of a covalent or physical nature. At least the chemical interaction of the carbon dioxide with the absorption agent ensures that a part of the carbon dioxide does not leave the liquid, thus depleting the air flow of carbon dioxide. It is also possible, for example, to introduce the air flow once or several times through one and the same liquid.

In method step c), the aqueous solution from method step b) or an aqueous solution comprising the carbon dioxide bound to the carbon dioxide absorption agent is introduced into a middle chamber of an at least three-chamber electrolysis cell of anode chamber, cathode chamber and at least one middle chamber arranged between the anode chamber and the cathode chamber, wherein the three-chamber electrolysis cell comprises a membrane selective for monovalent cations, and electrolyzing the aqueous solution under release at least a part of the carbon dioxide. After the absorption step, the solution is worked up with the absorption agent and the carbon dioxide bound to it in an electrolysis. In the electrolysis cell, the aqueous solution is therefore subjected to an electrical voltage so that a current flow is established within the electrolysis cell as a function of the voltage. For this purpose the individual compartments separated by the membrane, the electrolytic cell also comprises two electrodes. These electrodes are usually referred to as the anode and cathode. The migration of the cations through the cation-selective membrane leads to a pH difference between the middle chamber and the cathode chamber The lowering of the pH value in the intermediate chamber leads to the release of $CO_2$. Depending on the pH difference between the intermediate chamber and the cathode chamber, the electrical cell voltages that can be used to release the carbon dioxide can, for example, be greater than or equal to 1 V, further preferably greater than or equal to 1.5 V and further preferably greater than or equal to 1.75 V. In addition to the release of carbon dioxide, water can also be electrolyzed during the electrolysis, so that hydrogen and oxygen are produced at the electrodes. With this embodiment of the method, the electrolysis cell can be an at least three-chamber electrolysis cell of anode chamber, cathode chamber, and at least one middle chamber arranged between the anode chamber and the cathode chamber, wherein the anode chamber can be separated from the middle chamber, for example by a bipolar membrane, and the cathode chamber can be separated from the middle chamber by the membrane selective for monovalent cations, wherein the aqueous solution of method step c) is fed into the middle chamber of the electrolysis. Irrespective of the loading of the air flow with $CO_2$ and largely independent of the composition of the absorbent, absorbents loaded with $CO_2$ can be recycled particularly advantageously with a three-chamber electrolysis. This can be described particularly advantageously in the case of an absorbent consisting of a carbonate solution and, if necessary, additional absorption-accelerating promoters. The $CO_2$ intermediately bound as hydrogen carbonate can be released as a parallel reaction during the electrolytic generation of hydrogen and oxygen. The carbonate solution formed at the same time can be reused for $CO_2$ absorption from the air. Aim of separating $CO_2$ from the air is to use it as a synthesis component, for example in the production of hydrocarbons. In addition to the separation of $CO_2$, the production of hydrogen is both necessary and desirable. In the context of decarbonization, this will essentially be produced electrolytically in the future.

In a preferred embodiment of the method, the molar saturation of the absorption agent with carbon dioxide at a beginning of method step c) can be greater than or equal to 90 mol % and less than or equal to 100 mol % based on the concentration of the absorption agent in the aqueous solution. In order to carry out a particularly energy-efficient method, it has been found to be preferable for the absorption agent to be saturated with carbon dioxide to a particularly high degree prior to the electrolytic treatment. In this embodiment, a particularly low input of electrons can be used to ensure that a large proportion of the carbon dioxide is released from the aqueous solution without further conversion losses. These high loadings can be achieved, for example, by long contact times between the air flow and the aqueous solution. Furthermore, the molar saturation can preferably be greater than or equal to 95 mol %, more preferably greater than or equal to 98 mol %. The molar saturation indicates the proportion of absorption agent that is loaded with carbon dioxide. The proportion is calculated in comparison to the total absorption agent present.

Within a preferred aspect of the method, the carbon dioxide absorption agent can be selected from the group of alkali carbonates, alkali salts of amino acids or mixtures of at least two components from this group. In a water-based carbon dioxide absorbent, potassium carbonate or sodium carbonate react according to the reaction equation established below for sodium carbonate:

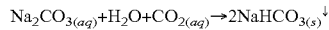

The solubility of this absorption agent changes as function of the loading with carbon dioxide, so that at atmospheric $CO_2$ concentrations below or around 400 ppm, a steady $CO_2$ uptake and precipitation as hydrogen carbonate or a hydrogen carbonate-containing compound takes place. This effect can be increased, for example, by adding further absorption promoters. For example, $Na_2CO_3$ and MEG (monoethylene glycol)/$H_2O$ and PEG150/$H_2O$ can be used. Suitable combinations for $K_2CO_3$ are, for example, MEG/$H_2O$ and PEG150/$H_2O$. In these embodiments, particularly large synergistic effects result. For the $K_2CO_3$, the precipitation product of the carbon dioxide absorbent according to embodiments is $KHCO_3$. In addition, the bath composition is also so robust that the precipitation of sodium or potassium hydrogen carbonate can be increased by adding equi-ionic additives, such as NaCl. This is particularly possible for carbonate/PEG/water solutions. Alternatively, mixtures of alkali carbonates and amino acid salts or only the use of alkali carbonates or amino acid salts as absorption agents can also be advantageous.

In a preferred embodiment of the method, the carbon dioxide absorption agent after $CO_2$ uptake can comprise hydrogen carbonate. The uptake of carbon dioxide and subsequent conversion of a hydrogen carbonate solution has significant advantages over the electrolysis of carbonate solutions. The stoichiometry of the conversion of $CO_2$ during the electrolysis of a carbonate solution is known. The following relationship applies to carbonate solutions:

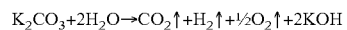

Two electrons are required for the release of a $CO_2$ molecule based on carbonates. The release of $CO_2$ from a hydrogen carbonate solution can be used as a parallel reaction in electrolytic $H_2$ and $O_2$ generation and can be expressed using the following equation:

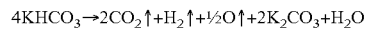

It is advantageous when using a hydrogen carbonate solution that only one electron is required for the release of a $CO_2$ molecule. The simultaneous release of $CO_2$ from a hydrogen carbonate solution during electrolytic hydrogen and oxygen production is therefore extremely energy-efficient. From a thermodynamic point of view, the potential difference to be overcome results from the water decomposition at 1.23 V and the overvoltages at the anode and the cathode at a total of around 0.5 V. The potential difference to be overcome for the release of $CO_2$ also depends on the concentration ratios in the intermediate chamber and the cathode chamber. These generate a potential difference of around 0.2 V at the cation-selective membrane. In addition to the electrochemically favorable stoichiometry, the formation of $O_2$ at the anode, the formation of $H_2$ at the cathode and simultaneously the formation of $CO_2$ in the intermediate chamber are induced in a three-chamber electrolyser. Stoichiometrically, ½ $O_2$, $H_2$, and 2 $CO_2$ are formed as almost pure gaseous components in separate volumes of the three chambers. There is therefore no need for a complex separation of the individual gas components. This principle can generally be extended to 3+2n chambers with n=0, 1, 2, 3 etc. The solution is then fed into each of the middle chambers.

Within a further preferred embodiment of the method, the carbon dioxide absorption agent in method step a) can comprise potassium carbonate with a concentration of greater than or equal to 200 g/L and less than or equal to 1200 g/L. Surprisingly, these high concentrations of carbonates in the absorbent lead to that carbon dioxide can be absorbed reliably and quickly even from air flows comprising only low concentrations of carbon dioxide. This can be, for example, ambient air with a carbon dioxide concentration of less than or equal to 400 ppm. Due to the very high concentration of carbonates, the hydrogen carbonates that form are driven close to their saturation concentration, so that they advantageously precipitate out of the liquid even under the conditions in the absorber. As a result, rapid and almost complete uptake of carbon dioxide can be achieved even with low overall carbon dioxide concentrations. Advantageously, the potassium carbonate concentration can be greater than or equal to 300 g/L and less than or equal to 1000 g/L, further preferably greater than or equal to 400 g/L and less than or equal to 900 g/L and further preferably greater than or equal to 500 g/L and less than or equal to 850 g/L.

Within a further preferred aspect of the method, at least 2 chambers of the 3-chamber electrolysis cell can be separated from each other by a bipolar membrane. In particular, the use of a bipolar membrane within a 3-chamber electrolysis cell can contribute to a particularly energetically efficient method for removing carbon dioxide from the solution. Preferably, the bipolar membrane can separate at least one of the middle chambers from the anode chamber. In this structure with a bipolar membrane, a membrane selective for monovalent cations can also separate one of the middle chambers from the cathode chamber.

In a further preferred embodiment of the method, the carbon dioxide absorption agent with absorbed carbon dioxide can be precipitated in a second method sub-step b') and separated from the solution of method step b), wherein in method step c) an aqueous solution of the precipitated carbon dioxide absorption agent with absorbed carbon dioxide is fed in, wherein the mother solution depleted in carbon dioxide absorption agent with absorbed carbon dioxide is fed at least in part into the cathode chamber of the electrolysis cell. In order to achieve a particularly electrically efficient desorption of carbon dioxide from the absorption liquid, it has proven to be advantageous that only absorption agents that are also loaded with carbon dioxide are fed to electrolysis. In the case of pure absorption of carbon dioxide on an absorption agent, an equilibrium will be established as a function of the ambient conditions. As a function of the position of the equilibrium, the absorption agent will sometimes be more or less loaded with carbon dioxide. If only loaded absorption agents is wanted to be used during electrolysis, for example, these carbon dioxide-loaded absorption agents can be separated from the solution and then these separated agents can be passed on for electrolysis within the scope of a new solution. In these cases, it is ensured that the electrolyzed solution comprises no unloaded absorption agents. This is particularly advantageous in cases where the not loaded absorption agents are converted during electrolysis with the consumption of electrons. By providing loaded absorption agents, this contribution is eliminated and the desorption of carbon dioxide can take place with a very low loss of electrons via further conversion. This method can be particularly suitable when carbonates are used as absorption agents. The carbonates can be converted into hydrogen carbonates by absorption of carbon dioxide and the hydrogen carbonates can be precipitated from the aqueous solutions. This prevents carbonate reactions during electrolysis.

In a further preferred embodiment of the method, the pH value in the middle chamber can be greater than or equal to pH 7.8 and less than or equal to pH 8.8, the pH value in the cathode chamber can be greater than or equal to pH 11 and less than or equal to pH 13.5, and the difference in the pH values of the middle chamber and the cathode chamber during electrolysis can be greater than or equal to 2.2 and less than 5.7. Within these pH limits, the system can be operated in a thermodynamically advantageous manner. The required reaction equilibria are quickly established and these differences are also advantageous from an electrochemical point of view. These limits can be used in particular when hydrogen carbonates are used as absorption agents.

In a further embodiment of the method, the concentration of carbon dioxide absorption agent with absorbed carbon dioxide when feeding in the electrolysis can be or equal to 2 mol/L and less than or equal to 8 mol/L. With these concentration limits, high amounts of carbon dioxide can be released with high activity. In addition, these concentration limits can be suitable for operating the cell structure over long periods of time.

According to a preferred characteristic of the method, the conductivity of the input current into a middle part of the electrolysis in method step c) can be greater than or equal to 0.1 S/cm and less than or equal to 0.5 S/cm. These conductivities for the input current into one or more parts of the 3-chamber electrolysis have been found to be particularly advantageous for the energetic efficiency of the electrolysis. The conductivity of this aqueous input current loaded with carbon dioxide is determined under operating conditions, in particular pressure and temperature, using methods known to the skilled person. For example, it is possible to determine the conductivity of the aqueous input current using a conductive conductivity sensor. These conductivities can be particularly useful in connection with the electrolysis of aqueous hydrogen carbonate solutions. This results in very high hydrogen carbonate concentrations, which preferably keep the conductivity of the electrolyte in this chamber high.

In a further preferred embodiment of the method, aqueous KOH solution can be used as electrolyte in the anode chamber of the at least 3-chamber electrolysis. Potassium hydroxide (KOH) can preferably be selected as the electrolyte for the anode chamber, as this electrolyte can comprise a correspondingly high conductivity under the operating conditions of the electrolysis.

Within a preferred aspect of the method, the conductivity of the aqueous KOH solution present in the anode chamber can be greater than or equal to 0.5 S/cm and less than or equal to 1.3 S/cm under operating conditions. This conductivity range and the use of KOH as the electrolyte can contribute to a particularly electrically efficient conversion process with the release of carbon dioxide in the context of the electrolysis.

In a further preferred embodiment of the method, the conductivity of the electrolyte solution present in the cathode chamber at the beginning of the electrolysis can be greater than or equal to 0.4 S/cm and less than or equal to 1.15 S/cm under operating conditions. For example, a carbonate/hydrogen carbonate solution with a hydrogen carbonate concentration close to the solubility limit can be fed into the cathode chamber to achieve these conductivities. These high concentrations can improve the electrical efficiency of the overall method. In addition, solutions with these conductivities comprise a sufficient proportion of potassium carbonate. Advantageously, the water vapor pressure of the absorption agent can also be controlled via the proportion of potassium carbonate in the solution. Depending on the humidity present, the water vapor pressure of the absorption agent can be adjusted for a certain range so that neither water evaporates from the absorption agent nor water is absorbed into the absorption agent from the atmosphere. Furthermore, it is advantageous that in these conductivity ranges, the $K^+$ ions that have migrated through the cation-selective membrane also form $K_2CO_3$ from the $KHCO_3$ present in the $KHCO_3/K_2CO_3$ solution.

In a further embodiment of the method, hydrogen carbonate can be separated from the absorption agent after method step b) and fed into the at least 3-chamber electrolysis as an aqueous solution with at least the addition of water. In this method variant, it can be dispensed with at least partly feeding in of the carbon dioxide-depleted mother solution into the cathode chamber of the electrolysis cell. The precipitation and concentration of the carbon dioxide absorption agent with absorbed carbon dioxide, for example in the form of hydrogen carbonate, can lead to previously described energetic advantages in 3-chamber electrolysis.

In a further preferred embodiment, the solution of the carbon dioxide absorption agent in method step a) can comprise a compound with an amine function as carbon dioxide absorption accelerator, wherein the compound with an amine function at 20° C. and at a concentration of 1 mol/kg comprises a carbamate equilibrium constant, determined from carbon dioxide partial pressure measurements, of greater than or equal to 0.01 and less than or equal to 0.75. The carbamate equilibrium constant is understood to be the following equilibrium constant:

$$K_{carb} = \frac{[RNH]*[HCO3]}{[RNHCOO]}$$

The equilibrium constant $K_{carb}$ (in mol/L) is a material parameter which describes the stability of carbamates that are formed during $CO_2$ absorption with the absorption accelerators in the absorption liquid. A low carbamate stability is expressed by a high value for $K_{carb}$. This means that carbamate formed reacts back to hydrogen carbonate and the amine. The latter in particular is desirable in the present case and leads to an improved carbon dioxide uptake rate. In particular, these amine additives can help to ensure that even air flows with relatively low carbon dioxide contents can be efficiently freed from carbon dioxide. Suitable amines for accelerating uptake are, for example, amino acids due to their very low vapor pressure. The amino acid pipecolic acid, for example, comprises a suitable carbamate stability. Amino acids with a carbamate equilibrium constant at 20° C. of greater than or equal to 0.02 and less than or equal to 0.5 and further preferably greater than or equal to 0.03 and less than or equal to 0.25 can also be used.

Further embodiments provide the use of the method for absorbing carbon dioxide from an air flow, wherein the air flow comprises a carbon dioxide concentration of greater than or equal to 100 ppm and less than or equal to 650 ppm. The method according to embodiments can be in particular suitable for further removing carbon dioxide from air flows having very low carbon dioxide concentrations. In prior art baths, these conditions usually lead to an uncontrollable absorption or release of water from the solution, which requires close method monitoring with corresponding control effort. The method presented here enables reliable and continuous absorption of carbon dioxide from these low-carbon dioxide streams and efficient and energetically advantageous desorption during electrolysis. Methods can also be established which can efficiently perform an uptake of carbon dioxide from the ambient air and can ensure an electrically suitable release as part of a 3-chamber electrolysis.

Further embodiments provide a respective 3-chamber electrolysis apparatus.

BRIEF DESCRIPTION OF THE DRAWINGS

Further advantages and advantageous embodiments of the embodiments according to the invention are illustrated by the figures and explained in the following examples. It should be noted that the figures are descriptive only and are not intended to limit the invention in any way.

DETAILED DESCRIPTION OF ILLUSTRATIVE EMBODIMENTS

Figure 1:
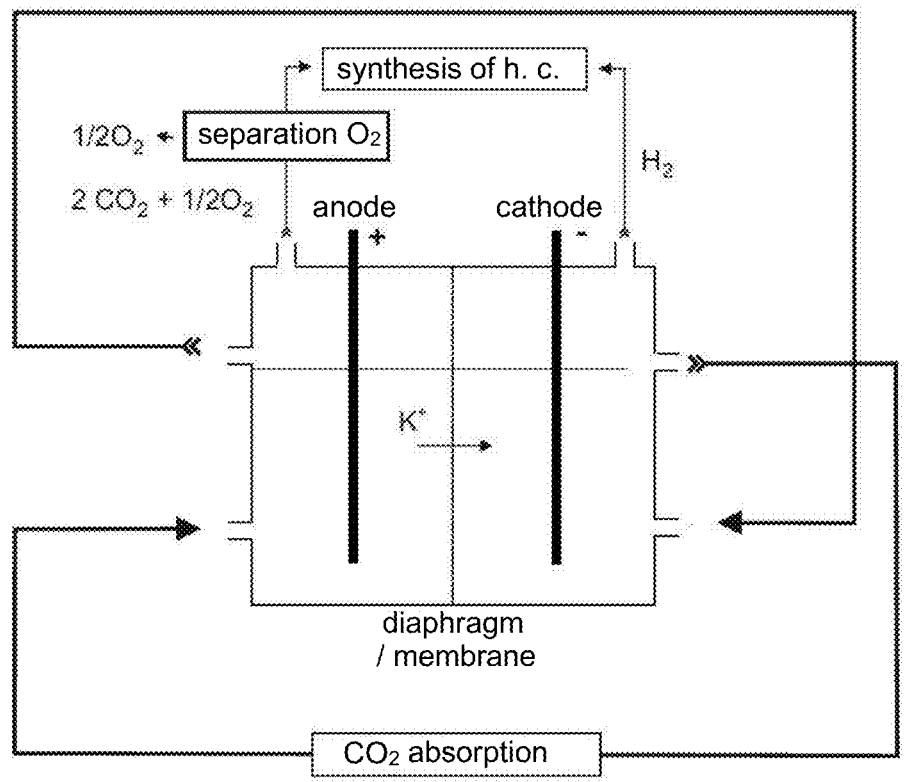
FIG. 1 shows a two-chamber electrolysis not according to the invention with return of the electrolyzed solution from the anode chamber to the cathode chamber.

FIG. 1 shows a two-chamber electrolysis not according to the invention with return of the electrolyzed solution from the anode chamber to the cathode chamber. This is a simple design of an electrolysis unit for the electrolysis of $H_2O$ and release of $CO_2$ from an absorption liquid for carbon dioxide. In addition, it is shown here that a return of the electrolyzed solution from the anode chamber to the cathode chamber is carried out. This electrolysis can be carried out, for example, with an absorbent of a salt that decomposes into cations and anions in aqueous solution. The anode and cathode compartment are separated by a cation-selective membrane. During electrolysis, the pH value at the anode decreases while the pH value at the cathode increases. Since the absorption of $CO_2$ into an aqueous solution is always associated with a decrease in the pH value for the known $CO_2$ absorbents, alkalis, carbonates, amino acid salts and amines-primary, secondary, tertiary-$CO_2$ can always be expelled from the solution by reducing the pH value. It is particularly advantageous if the $CO_2$ absorbent contains the cation itself. These are, for example, the alkalis of all alkali metals, carbonates of all alkali metals and the amino acid salts of all alkali metals. In the case of $CO_2$ absorbents that do not contain alkali metals, a neutral salt that is not electrolyzed, for example $K_2SO_4$ or similar, can be added to the absorption solution. This results in a use as a matter of principle of the electrolysis principle to a large number of known $CO_2$ absorbents. The energy required for $CO_2$ release in addition to the electrolysis of $H_2O$ results from the pH difference between the middle chamber and the cathode compartment required for $CO_2$ expulsion and the resulting potential difference. This is substance-specific and can vary between 0.8 V and 0.25 V. Furthermore, the number of electrons required to release a $CO_2$ molecule is also substance-specific and depends on the achievable loading capacity corresponding to the $CO_2$ partial pressure in the absorber. The number of electrons required varies between 1 and 2. A general difference to the known methods in this embodiment can be seen in the fact that the solution depleted of $CO_2$ in the anode chamber is passed into the cathode chamber before $CO_2$ absorption takes place again. Neutralization takes place there, which lowers the pH value in the cathode chamber. The resulting reduction in the potential difference significantly reduces the energy required to release $CO_2$. The advantages of the method result in particular from its general applicability; the simple method engineering design, as it can be operated directly on a $CO_2$ absorber column and the stacked design of the electrolysis cell due to the use of bipolar membranes.

Figure 2:
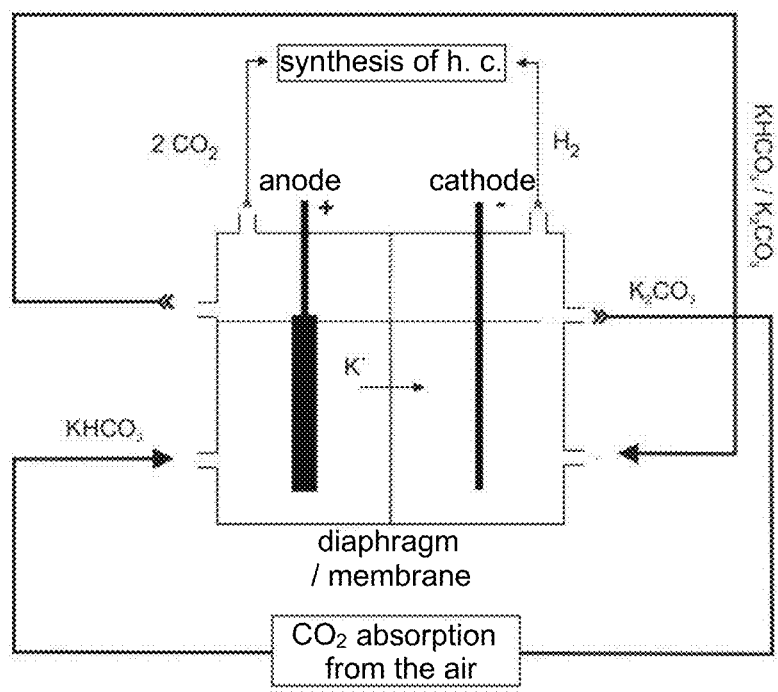
FIG. 2 shows a two-chamber electrolysis not according to the invention with return of the electrolyzed solution from the anode chamber to the cathode chamber and a functionalized Ni anode.

FIG. 2 shows a partial method step not according to the invention in the form of a two-chamber electrolysis of a carbon dioxide-loaded air flow with a nickel hydroxide anode. An absorbent with an alkali carbonate component is loaded with carbon dioxide from an air flow. The carbonate is converted, at least partially, into hydrogen carbonate, which is introduced into the anode chamber of a two-chamber electrolysis cell. The electrolysis cell comprises an alkali-permeable membrane that separates the anode compartment from the cathode compartment. The anode is a porous anode that is able to bind oxygen. In this respect, only the carbon dioxide formed leaves the anode chamber. Hydrogen is formed in the cathode compartment. In this respect, the different gases accumulate in different places and do not have to be separated from each other in a complex process. The anode can then be regenerated thermally from time to time by releasing oxygen. The following reactions occur:

Anode $$2KHCO_3 \rightarrow 2K^+ + 2HCO_3^-$$

$$2HCO_3^- \rightarrow 2CO_2 + 2OH^-$$

$$2Ni(OH)_2 + 2OH^- \rightarrow 2NiOOH + 2H_2O + 2e^-$$

The overall reaction is as follows:

$$(KHCO_3 + Ni(OH)_2 \rightarrow K^+ + CO_2 + NiOOH + e^-) \times 2$$

The following reactions take place at the cathode:

$$4H_2O \rightarrow 2H_3O^+ + 2OH^-$$

$$2H_3O^+ + 2e^- \rightarrow H_2 + 2H_2O$$

$$2KHCO_3 + 2K^+ + 2OH^- \rightarrow 2K_2CO_3 + 2H_2O$$

Overall, the total reaction in the cathode chamber is:

$$2KHCO_3 + 2K^+ + 2e^- \rightarrow 2K_2CO_3 + H_2$$

Figure 3:
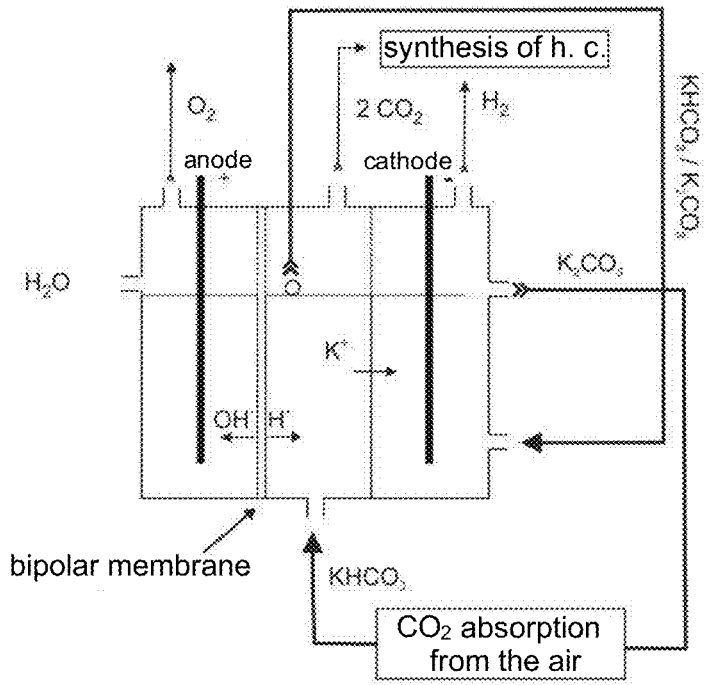
FIG. 3 shows a three-chamber electrolysis according to embodiments with return of the electrolyzed solution from the middle chamber to the cathode chamber.

FIG. 3 shows a partial method step according to embodiments in the form of a three-chamber electrolysis of a carbon dioxide-loaded absorbent. A carbonate-based absorbent can, for example, be loaded with carbon dioxide from an air flow, such as ambient air or industrial exhaust air. Due to the absorption an at least partial conversion of the carbonate into hydrogen carbonate occurs. The hydrogen carbonate containing solution is fed into the middle chamber of an electrolysis unit comprising at least three chambers. The middle chamber is separated from the anode compartment by a bipolar membrane and from the cathode compartment by a membrane that is permeable to potassium or alkali ions in general. By applying a voltage, oxygen is generated in the anode compartment, hydrogen in the cathode compartment and carbon dioxide in the middle compartment. The individual gas flows can be collected separately. The carbon dioxide-depleted solution in the middle chamber now comprises a higher carbonate and a lower hydrogen carbonate content. This recycled solution can be used again as an absorbent for a carbon dioxide containing air flow. In the form of reaction equations, the following conversions occur at the different reaction sites:

At the anode:

$$2OH^- \rightarrow H_2O + \tfrac{1}{2}O_2 + 2e^-$$

On the bipolar membrane:

$$2H_2O \rightarrow 2H^+ + 2OH^-$$

In the intermediate cell:

$$2HCO_3^- + 2H^+ \rightarrow 2CO_2 + 2H_2O$$

In total this results in the total reaction of the intermediate cell:

$$2KHCO_3 + 2H^+ \rightarrow 2K^+ + 2CO_2 + 2H_2O$$

The following reactions take place at the cathode:

$$4H_2O \rightarrow 2H_3O^+ + 2OH^-$$

$$2H_3O^+ + 2e^- \rightarrow H_2 + 2H_2O$$

$$2KHCO_3 + 2K^+ + 2OH^- \rightarrow 2K_2CO_3 + 2H_2O$$

This results in a total for the cathode chamber:

$$2KHCO_3 + 2K^+ + 2e^- \rightarrow 2K_2CO_3 + H_2$$

The three-chamber structure can be extended as required in relation to the middle unit. In this respect, 5-, 7-, 9- or generally 3+2n-chamber structures can also be used with only slightly modified electrochemical properties with the absorbent according to embodiments or, for example, with pure hydrogen carbonate or amino acid solutions.

Figure 4:
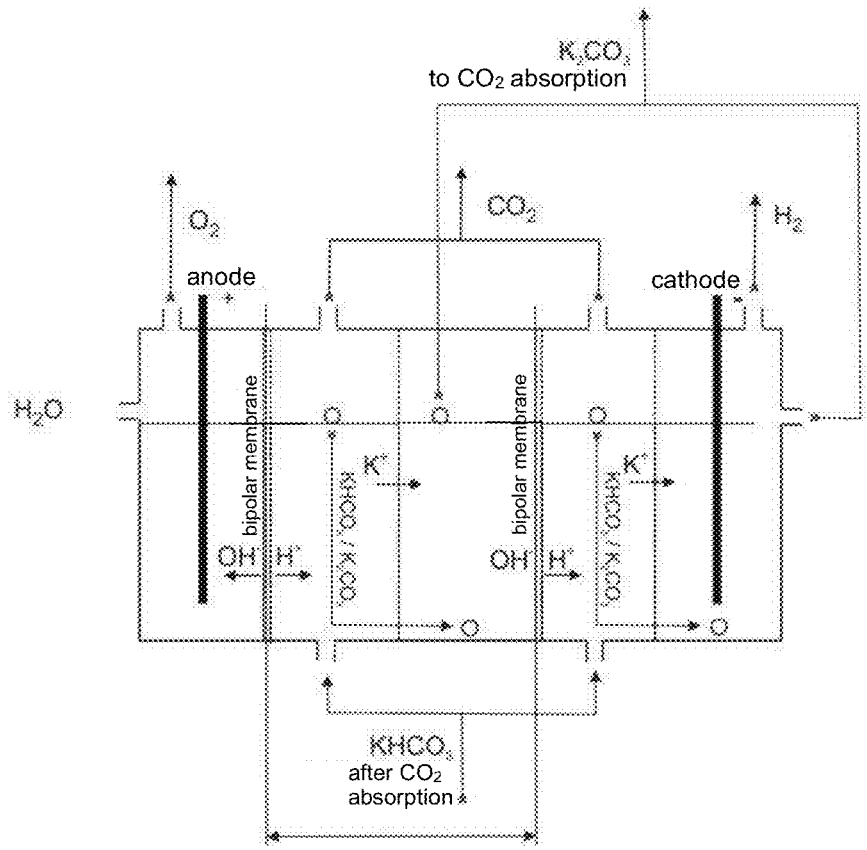
FIG. 4 shows a five-chamber electrolysis according to embodiments with return of the electrolyzed solution from the middle chamber to the cathode chamber.

FIG. 4 shows a five-chamber electrolysis according to embodiments with return of the electrolyzed solution from the middle chamber to the cathode chamber. Due to the structure according to embodiments, several "middle" chambers can be used for the release of carbon dioxide. Accordingly, several bipolar membranes and cation-selective membranes are used.

Figure 5:
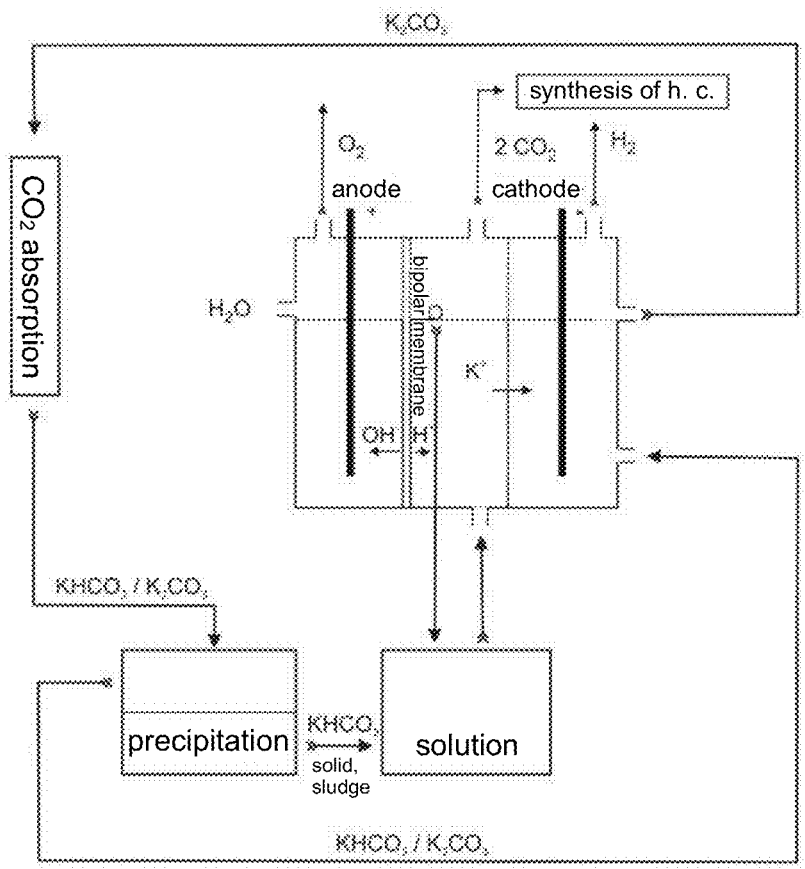
FIG. 5 shows a three-chamber electrolysis according to embodiments with separate precipitation step of the absorption agent saturated with $CO_2$.

FIG. 5 shows a three-chamber electrolysis according to embodiments with a separate precipitation step of the absorption agent saturated with $CO_2$. After absorption of the carbon dioxide, the absorption agent saturated with carbon dioxide is precipitated together. The precipitated agent can then be fed into the electrolysis method in 100% pure form. This method can ensure that only one species is electrolyzed during the electrolysis. This can improve the electrical efficiency parameters of the overall method. The separate precipitation step can also be added upstream of a two-chamber electrolysis.

Figure 6:
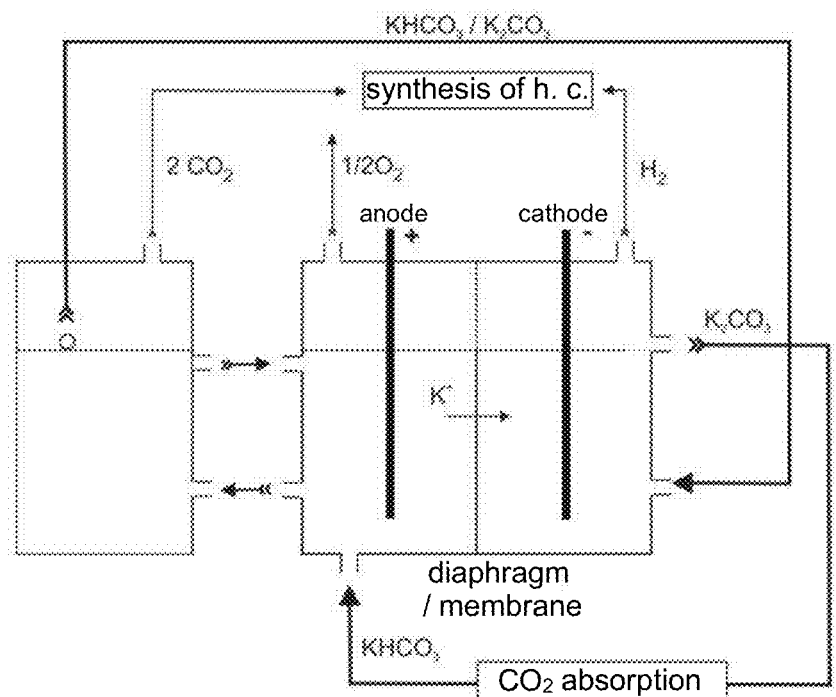
FIG. 6 shows a two-chamber electrolysis not according to the invention with separate release of the $CO_2$ in a further chamber.

FIG. 6 shows a two-chamber electrolysis not according to the invention with separate release of the $CO_2$ in a further chamber. To separate the individual gas flows of the electrolysis, the release of carbon dioxide can in principle also take place in a compartment arranged outside the electrolysis cell. The release is caused by pressure and/or temperature changes. After the release of carbon dioxide, the solution can be fed into the cathode chamber. A separate precipitation step can be carried out before electrolysis. The solution enriched with $KHCO_3$ is fed into the anode chamber and the depleted solution into the cathode chamber (FIG. 5).

Figure 7:
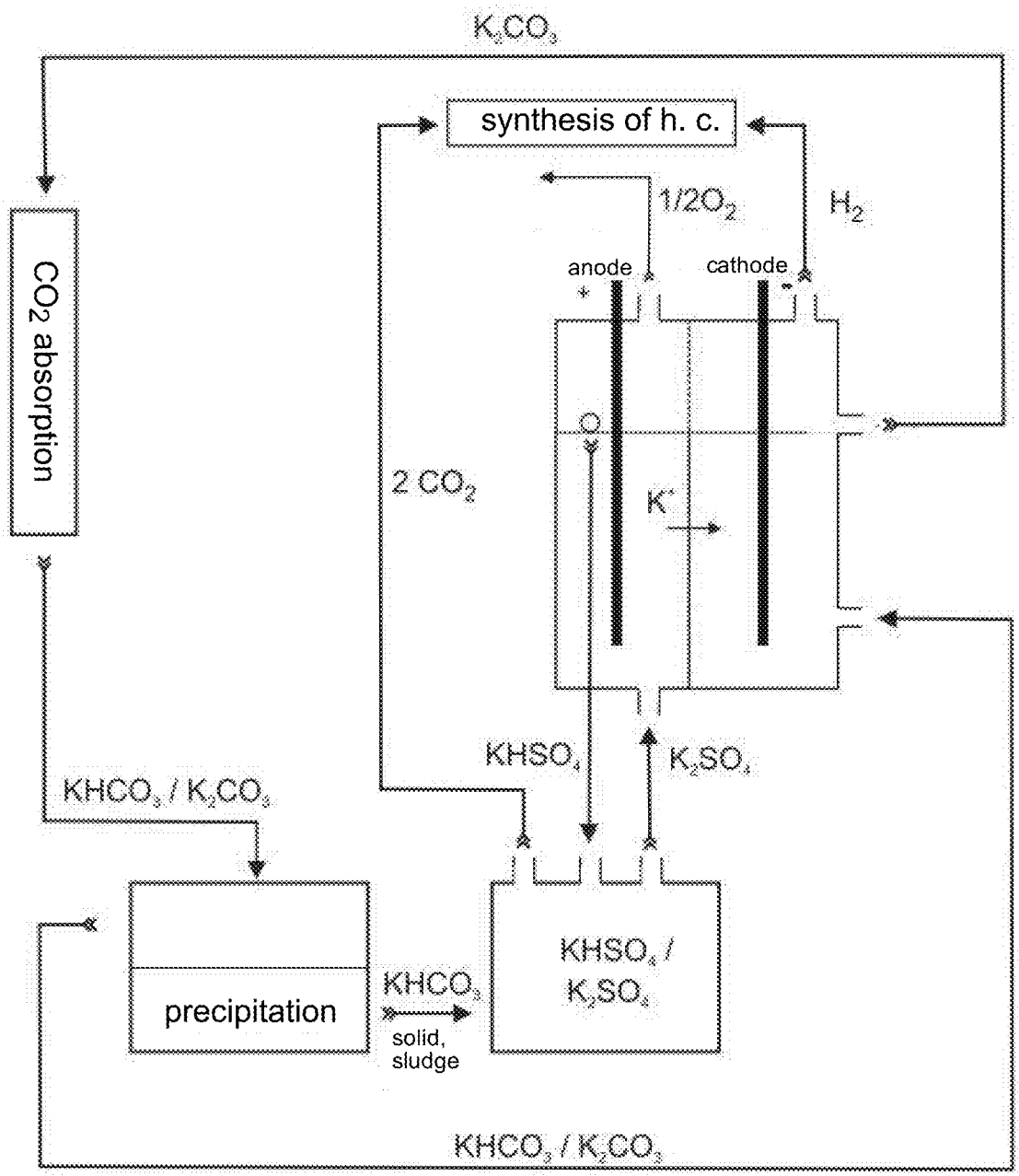
FIG. 7 shows a two-chamber electrolysis not according to the invention with separate precipitation step of the absorption agent saturated with $CO_2$ and release of the $CO_2$ from $KHCO_3$ by $KHSO_4$.

FIG. 7 shows a two-chamber electrolysis not according to the invention with a separate precipitation step of the absorption agent saturated with $CO_2$. In this variant, an in advance precipitation of the saturated absorbent occurs. The precipitation product, $KHCO_3$ is transferred as a solid or sludge into a $KHSO_4/K_2SO_4$ solution according to the following reaction equation:

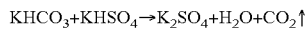

$CO_2$ is released.

The driving force here is that $KHSO_4$, PH=0.7 corresponding to a 10 wt. % solution, is a stronger acid than $KHCO_3$, PH=7.9 corresponding to a 10 wt. % solution. The $KHSO_4/K_2SO_4$ solution enriched with $K_2SO_4$ is fed into the anode chamber, there takes place corresponding to the overall reaction in the anode compartment:

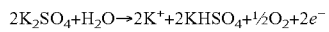

the release of $O_2$ with the formation of $KHSO_4$.

The $KHSO_4/K_2SO_4$ solution, now enriched with $KHSO_4$, is fed back into the reaction vessel to release the $CO_2$. $H_2$ is released in the cathode compartment, while the $KHCO_3/K_2CO_3$ solution is enriched with $K_2CO_3$ for again $CO_2$ absorption:

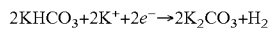

Compared to the electrolysis of $KHCO_3$ (FIG. 14), a voltage drop of around 0.2 V higher at the cation-selective membrane can be observed for the electrolysis of $KHSO_4$, due to the lower pH value. The method variant shown in FIG. 7 is therefore an energy-efficient method for the release of $CO_2$ and $O_2$ in separate volumes.

Figure 8:
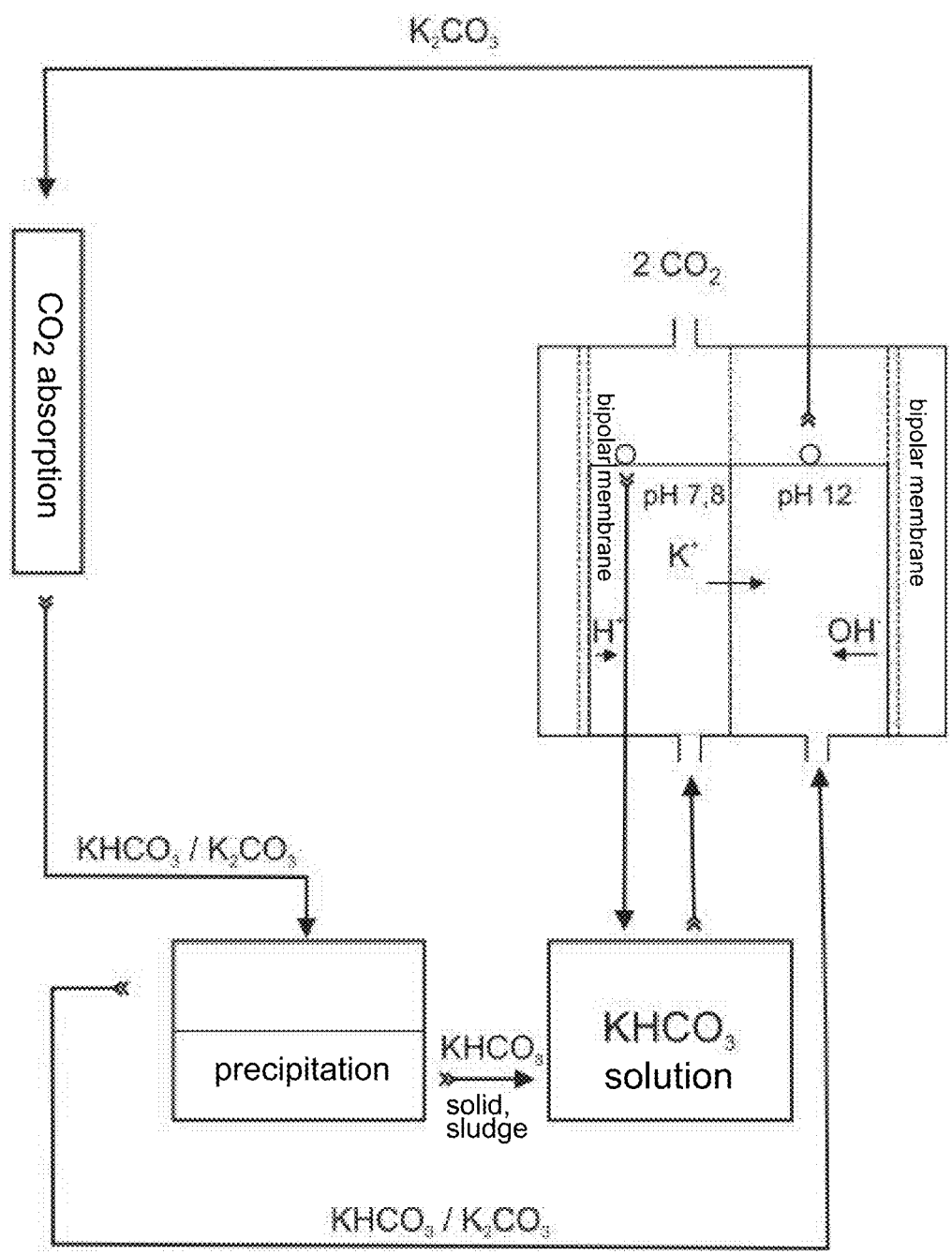
FIG. 8 shows a two-chamber electrolysis unit not according to the invention with separate precipitation step of the absorption agent saturated with $CO_2$.

FIG. 8 as a section of FIG. 4 an expandable stack separated by bipolar membrane. In addition, a separate precipitation step of the absorption agent saturated with $CO_2$ is arranged upstream of the electrolysis. The separate precipitation and dissolution step can increase the electrical efficiency of the electrolysis, as in these cases only hydrogen carbonate and no carbonate enters the electrolysis cell.

Figure 9:
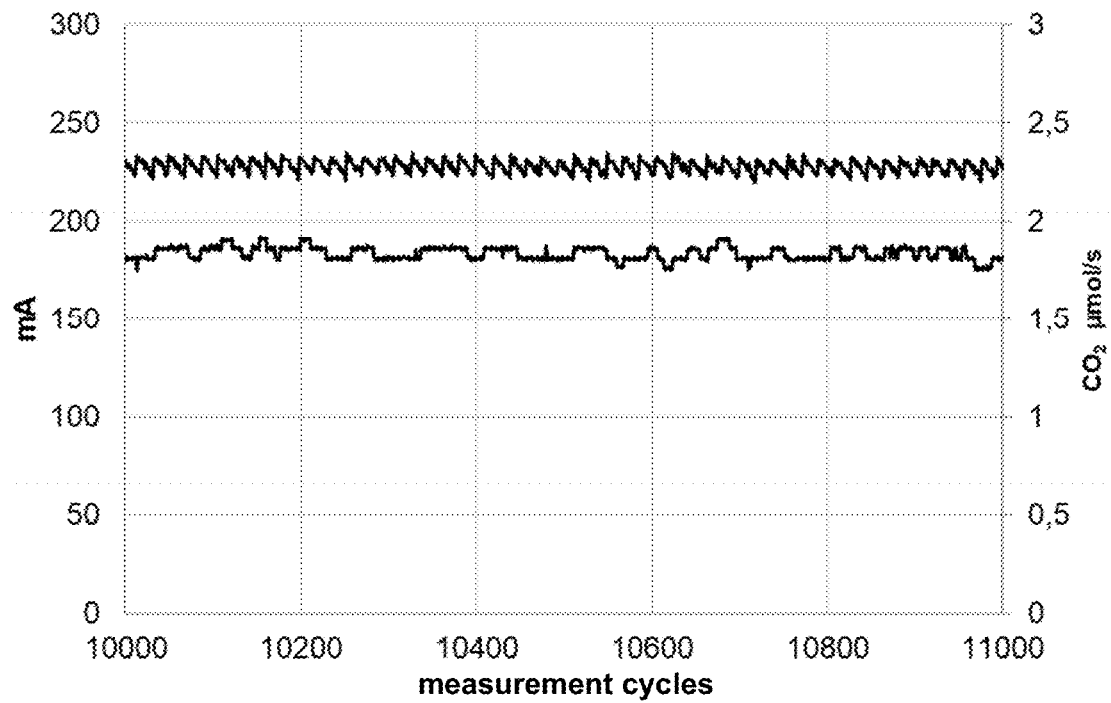
FIG. 9 shows the current curve and carbon dioxide evolution of a hydrogen carbonate-based absorbent in a three-chamber electrolysis.

FIG. 9 shows the current curve and the carbon dioxide evolution of a hydrogen carbonate-based absorbent in a three-chamber electrolysis. The absorbent is based on a 10 wt. % $KHCO_3$ solution and in the figure the measured intensity of current and the determined $CO_2$ volume flow as a function of the measurement cycles is shown. The data of the measurement cycles are plotted from 10,000 to 11,000, wherein the time interval of a measurement cycle is 1 second. The measurement was carried out at a temperature of 20° C. Electrolyte solutions with the following ingredients were used: anode: KOH 5.4 wt. %; intermediate chamber: $KHCO_3$ 10 wt. %; cathode: $KHCO_3$ 10 wt. %. The fluctuating current flow is due to bubble formation and detachment on the surface of the bipolar membrane. For a similar reason, the $CO_2$ gas flow rate also fluctuates somewhat. The stoichiometric ratio of the released gas quantities corresponded approximately to the ratio: 2:1:½ for $CO_2$, $H_2$, $O_2$. The Faraday efficiency achieved in the simple experimental setup in relation to $CO_2$ was approximately 80%.

Figure 10:
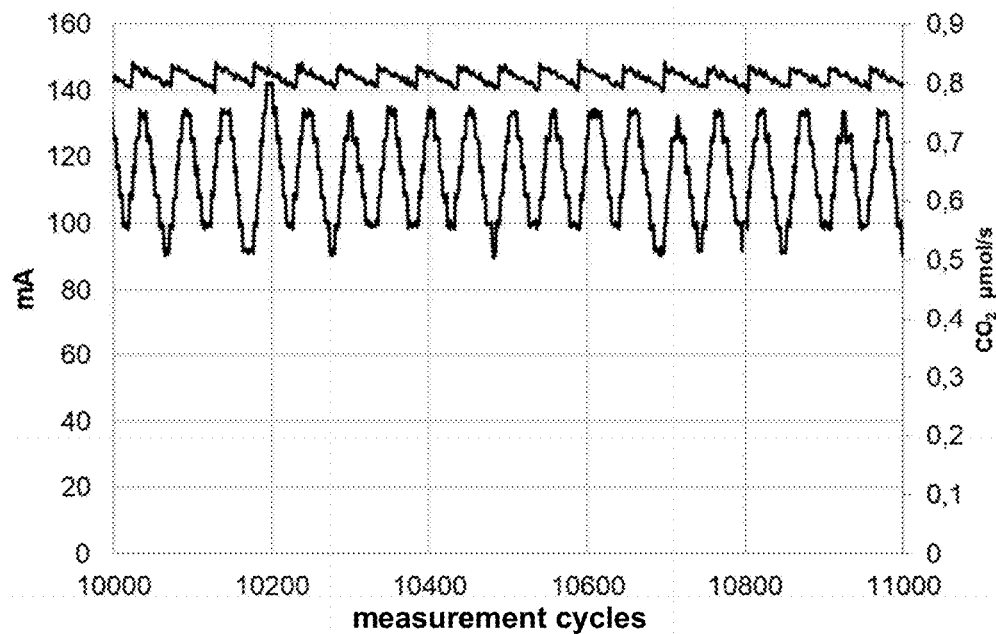
FIG. 10 shows the current curve and the carbon dioxide evolution of an amino acid-based absorbent in a three-chamber electrolysis.

FIG. 10 shows the current curve and carbon dioxide evolution of an amino acid-based absorbent in a three-chamber electrolysis. The intensity of current used and the $CO_2$ gas flow rate achieved during the electrolysis of an amino acid salt solution loaded with $CO_2$ in the three-chamber electrolysis is plotted. The measurement was also carried out at a temperature of 20° C. Electrolyte solutions of the following composition were used: anode: KOH, 5.4 wt. %; intermediate chamber: loaded amino acid salt solution with proline, 10 wt. %; cathode: loaded amino acid salt solution proline 10 wt. %. The $CO_2$ loading was carried out before electrolysis in a bubble column reactor by passing through a 14 vol % $CO_2$ gas stream. The measured fluctuating current flow is also due to bubble formation and detachment on the surface of the bipolar membrane. The same applies to the fluctuations in the $CO_2$ gas flow rate. The stoichiometric ratio of the released gas quantities corresponded approximately to the ratio: 1:1:½ for $CO_2$, $H_2$, $O_2$. The Faraday efficiency achieved in this simple experimental setup in relation to $CO_2$ was approximately 85%.

Figure 11:
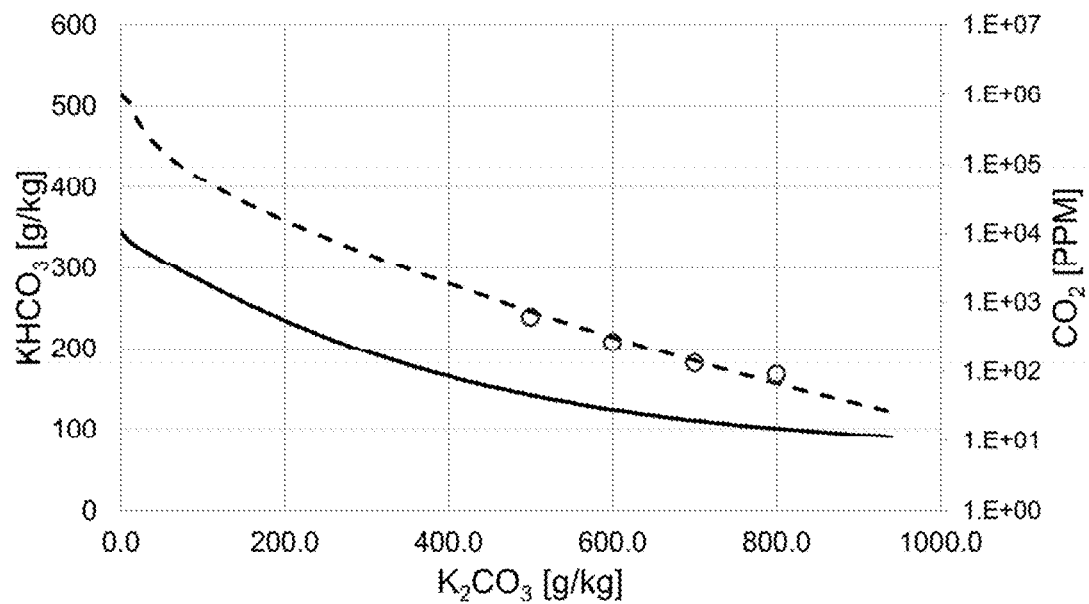
FIG. 11 shows the solubility of $KHCO_3$ in $K_2CO_3$ and the $CO_2$ partial pressure at saturation with $KHCO_3$.

FIG. 11 shows the solubility of $KHCO_3$ in $K_2CO_3$ and the $CO_2$ partial pressure at saturation with $KHCO_3$. The plotted line corresponds to the solubility of $KHCO_3$, left ordinate, in a $K_2CO_3$ solution at 293 K. The calculated and experimentally confirmed (open circles) $CO_2$ partial pressure is shown as a dashed line, right ordinate. It can be seen from the plot that with a $K_2CO_3$ concentration of >40 g/l, $KHCO_3$ precipitates from the solution below a $CO_2$ concentration of 140000 Pa. $CO_2$ absorption from flue gases into a $K_2CO_3$ solution and precipitation of the absorbed $CO_2$ as $KHCO_3$ is possible from a concentration of $K_2CO_3$>40 g. The absorption of $CO_2$ from the air, with a $CO_2$ concentration of around 400 ppm, and precipitation as $KHCO_3$ can be observed from a $K_2CO_3$ concentration of 560 g/l.

Figure 12:
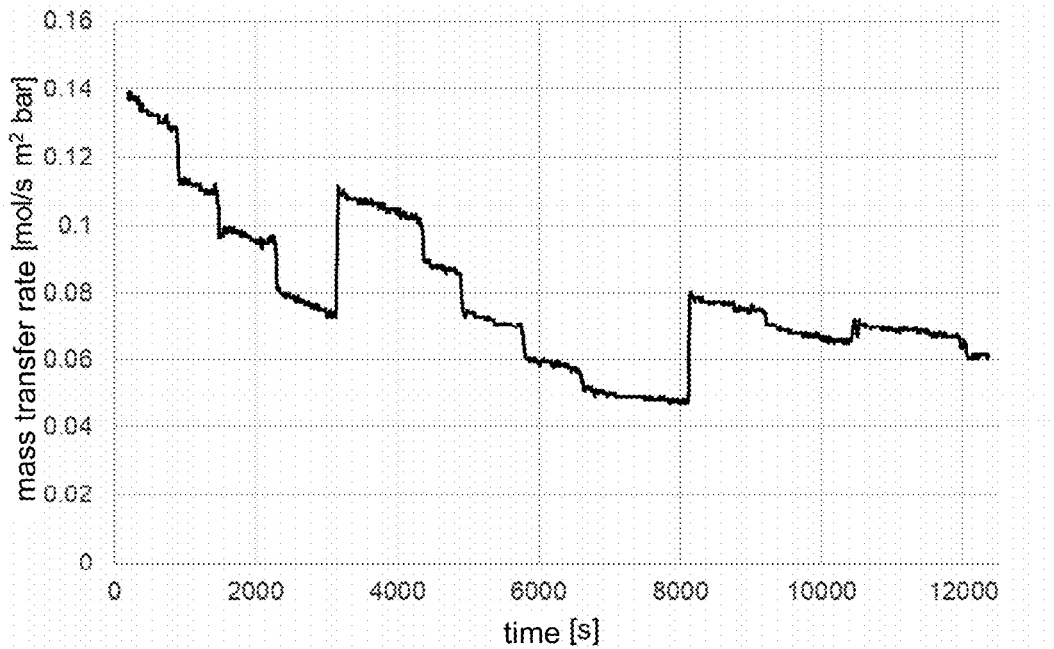
FIG. 12 shows the mass transfer rates for the uptake of $CO_2$ into a $KHCO_3/K_2CO_3$ solution at 323 K.

FIG. 12 shows the experimentally determined mass transfer rates for the absorption of $CO_2$ into a $KHCO_3/K_2CO_3$ solution at 323 K. The potassium salt of pipecolic acid was added at a concentration of 2 mol/l as the $CO_2$ absorption promoter. The $K_2CO_3$ concentration was gradually increased from 138.25 g/kg to 542.5 g/kg during the measurement period. $KHCO_3$ was also added in portions in a concentration range from 0 to 440 g/kg. The $CO_2$ uptake rate was thus determined along the $KHCO_3$ saturation limit with increasing $K_2CO_3$ concentration. The $CO_2$ uptake rate decreases with increasing $K_2CO_3$ concentration and with the addition of $KHCO_3$ until the saturation limit is reached. With an average value of 0.08 mol/s m² bar, the $CO_2$ mass transfer rate is sufficient for large-scale use of a packing column.

Figure 13:
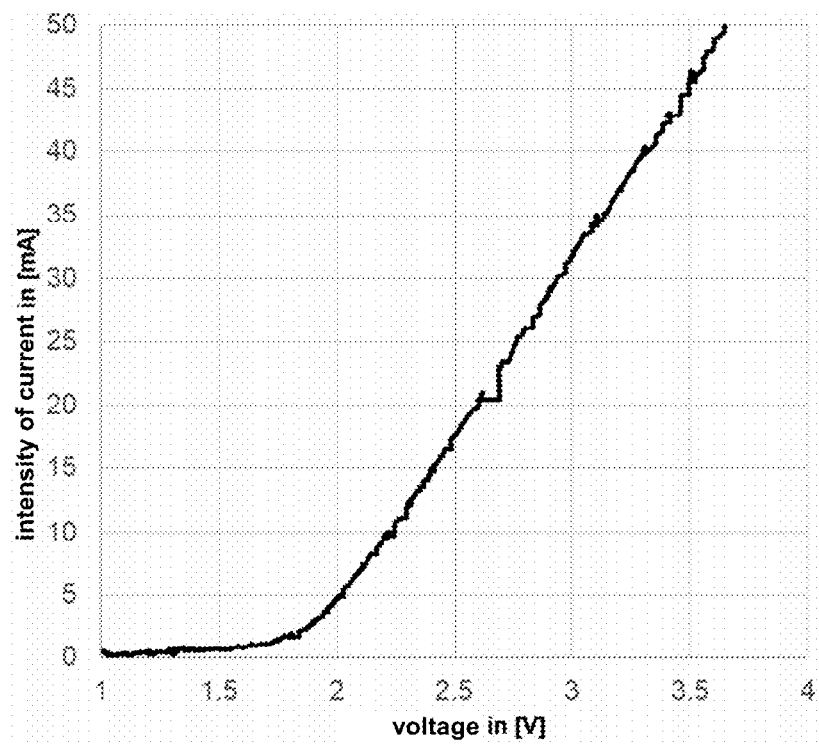
FIG. 13 shows the current/voltage characteristic of the electrolysis of a 1 molal KOH solution.

FIG. 13 shows the current/voltage characteristic of the electrolysis of a 1 molal KOH solution using the setup outlined in FIG. 1. The anode and cation compartments are separated by a cation-selective membrane. The electrolysis of the KOH solution requires a cell voltage of approximately 1.8 V. An additional voltage drop at the cation-selective membrane is not observed.

Figure 14:
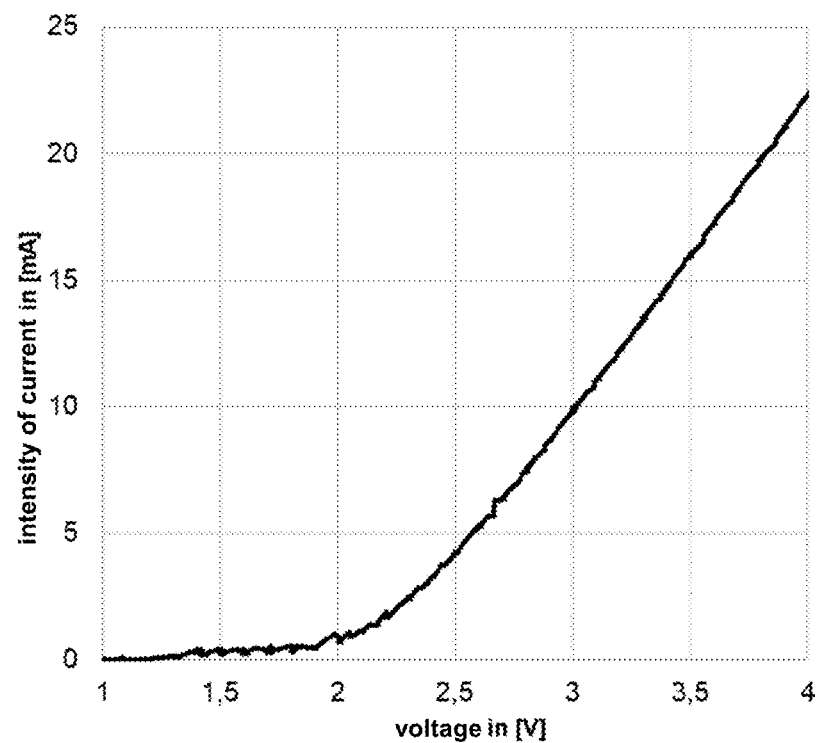
FIG. 14 shows the current/voltage characteristic of the electrolysis of a 1 molal $KHCO_3$ solution in the anode compartment and a 0.5 molal $K_2CO_3$ solution in the cathode compartment compared to the electrolysis shown in FIG. 13 with a 1 molal KOH solution in the anode and cathode compartment.

FIG. 14 enables a direct comparison of the current/voltage characteristics measured in the laboratory for a 1 molal KOH in the anode and cathode compartment (see FIG. 13) in analogy to the electrolysis of a 1 molal $KHCO_3$ solution in the anode and a 0.5 molal $K_2CO_3$ solution in the cathode compartment. The additional voltage drop across the cation-selective membrane, which is required to release the $CO_2$, is given by the pH difference in the anode chamber and cathode chamber resulting from the loaded and unloaded absorbent. Depending on the concentration, this varies for $KHCO_3$ between pH=7.8-8 in the anode chamber and for $K_2CO_3$ between pH=11.5 and 13.5. At a concentration of 1 mol/kg $KHCO_3$ in the anode chamber, pH=7.9 and 0.5 mol/kg $K_2CO_3$ in the cathode chamber, pH=11.7, an additional voltage drop of theoretically $\psi$=0.22 V results using Nernst's equation. This corresponds to $\Delta G$=22 kJ per mole of $CO_2$ This corresponds approximately to the thermodynamic minimum. The electrolytic release of $CO_2$ from a $KHCO_3$ solution to form $K_2CO_3$ thus represents the most energetically effective form of release of absorbed $CO_2$. The laboratory measurements confirm the above theoretical considerations with a cell voltage of just over 2 V.

Figure 15:
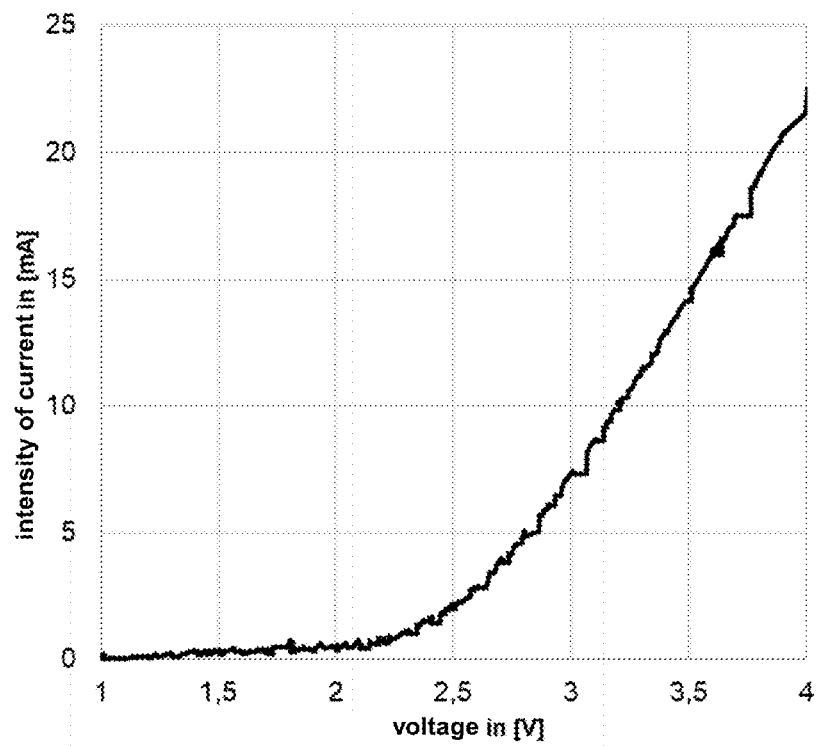
FIG. 15 shows the current/voltage curve of a 0.5 molal $K_2SO_4$ solution, pH=7.4 in the anode chamber and a 1 molal $K_2CO_3$ solution, pH=11.8, in the cathode chamber.

FIG. 15 shows the current/voltage curve of a 0.5 molal $K_2SO_4$ solution, pH=7.4 in the anode chamber and a 1 molal $K_2CO_3$ solution, pH=11.8, in the cathode chamber. The direct comparison of the current/voltage curves with the previously discussed electrolysis of a $KHCO_3/K_2CO_3$ solution confirms that the higher pH difference between the anode and cathode chamber results in a higher experimentally observed electrolysis voltage of about 0.2 V. The electrolysis of a $K_2SO_4$ solution corresponds to the method presented in FIG. 7.

Figure 16:
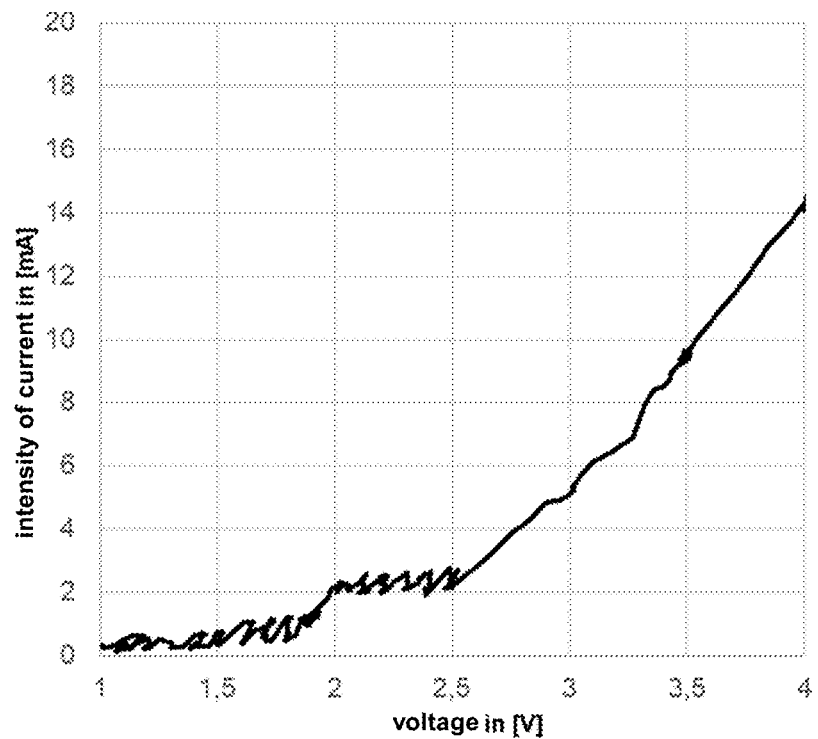
FIG. 16 shows the current/voltage characteristic curve of an electrolysis according to embodiments in a three-chamber system.

FIG. 16 shows the current/voltage characteristic of the electrolysis in a three-chamber system as shown in FIG. 5. In the anode chamber there is a one molal KOH solution with a pH=14. In the intermediate chamber as well as in the cathode chamber there is the same solution corresponding to a composition of: $KHCO_3$ 5 wt. %+$K_2CO_3$ 5 wt. % with a pH=9.5. In comparison to FIG. 13, it can be seen from the figure that an additional electrolysis voltage of about 0.5 V is required due to the use of the bipolar membrane. Theoretically, this results in a membrane potential of 0.27 V.

The invention claimed is:

1. A method for isolating carbon dioxide from an air flow, the method comprising:
   a) providing an aqueous solution of a carbon dioxide absorption agent, wherein the carbon dioxide absorption agent comprises cations of the 1st main group of the periodic table;
   b) passing the air flow containing the carbon dioxide through the aqueous solution of method step a), wherein at least a part of the carbon dioxide of the air flow is bound to the carbon dioxide absorption agent and the air flow is depleted in the carbon dioxide, wherein, in method sub-step b'), the carbon dioxide absorption agent with absorbed carbon dioxide is precipitated and separated from the aqueous solution of method step b); and
   c) introducing an aqueous solution of the precipitated carbon dioxide absorption agent with absorbed carbon dioxide into a middle chamber of an at least three-chamber electrolysis cell of an anode chamber, a cathode chamber, and at least one middle chamber arranged between the anode chamber and the cathode chamber, wherein the at least three-chamber electrolysis cell comprises a membrane selective for monovalent cations, and electrolyzing the aqueous solution of the precipitated carbon dioxide absorption agent with absorbed carbon dioxide under release of at least a part of the carbon dioxide, and wherein a mother solution depleted in the carbon dioxide absorption agent with absorbed carbon dioxide is introduced at least in part into the cathode chamber of the at least three-chamber electrolysis cell.

2. The method according to claim 1, wherein a molar saturation of the carbon dioxide absorption agent with absorbed carbon dioxide at a beginning of method step c) is greater than or equal to 90 mol % and less than or equal to 100 mol % based on a concentration of the carbon dioxide absorption agent in the aqueous solution of method step b).

3. The method according to claim 1, wherein the carbon dioxide absorption agent is selected from the group consisting of alkali carbonates, alkali salts of amino acids, and mixtures of at least two components from this group.

4. The method according to claim 1, wherein the carbon dioxide absorption agent comprises hydrogen carbonate after $CO_2$ uptake.

5. The method according to claim 4, wherein the carbon dioxide absorption agent in method step a) comprises potassium carbonate with a concentration of greater than or equal to 200 g/L and less than or equal to 1200 g/L.

6. The method according to claim 1, wherein at least 2 chambers of the at least three-chamber electrolysis cell are separated from each other by a bipolar membrane.

7. The method according to claim 1, wherein a concentration of the carbon dioxide absorption agent with absorbed carbon dioxide when feeding into the at least three-chamber electrolysis cell is greater than or equal to 2 mol/L and less than or equal to 8 mol/L.

8. The method according to claim 1, wherein a conductivity of an input current to the at least one middle chamber of the three-chamber electrolysis cell in method step c) is greater than or equal to 0.1 S/cm and less than or equal to 0.5 S/cm.

9. The method according to claim 1, wherein an aqueous KOH solution is used as electrolyte in the anode chamber of the at least three-chamber electrolysis cell.

10. The method according to claim 9, wherein a conductivity of the aqueous KOH solution present in the anode chamber under operating conditions is greater than or equal to 0.5 S/cm and less than or equal to 1.3 S/cm.

11. The method according to claim 1, wherein a conductivity of an electrolyte solution present in the cathode chamber at a beginning of an electrolysis under operating conditions is greater than or equal to 0.4 S/cm and less than or equal to 1.15 S/cm.

12. The method according to claim 4, wherein, after method step b), hydrogen carbonate is separated from the carbon dioxide absorption agent and added to the at least three-chamber electrolysis cell as an aqueous solution with at least added water.

13. The method according to claim 1, wherein the aqueous solution of the carbon dioxide absorption agent in method step a) comprises a compound having an amine function as a carbon dioxide absorption accelerator, and wherein the compound having the amine function at 20° C. and at a concentration of 1 mol/kg comprises a carbamate equilibrium constant, determined from carbon dioxide partial pressure measurements, of greater than or equal to 0.01 and less than or equal to 0.75.

14. The method according to claim 1, wherein the air flow comprises a carbon dioxide concentration of greater than or equal to 100 ppm and less than or equal to 650 ppm.

* * * * *